(12) United States Patent
Hulford

(10) Patent No.: US 9,791,943 B2
(45) Date of Patent: Oct. 17, 2017

(54) CONVERTIBLE COMPUTING DEVICE

(75) Inventor: Tim Hulford, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 408 days.

(21) Appl. No.: 13/976,020

(22) PCT Filed: Sep. 30, 2011

(86) PCT No.: PCT/US2011/054253
§ 371 (c)(1),
(2), (4) Date: Jun. 25, 2013

(87) PCT Pub. No.: WO2013/048443
PCT Pub. Date: Apr. 4, 2013

(65) Prior Publication Data
US 2013/0271378 A1   Oct. 17, 2013

(51) Int. Cl.
| | |
|---|---|
| G06F 3/02 | (2006.01) |
| G09G 3/20 | (2006.01) |
| G06F 1/16 | (2006.01) |
| G06F 3/14 | (2006.01) |

(52) U.S. Cl.
CPC ............ *G06F 3/0227* (2013.01); *G06F 1/162* (2013.01); *G06F 1/1616* (2013.01); *G06F 1/1637* (2013.01); *G06F 1/1643* (2013.01); *G06F 1/1677* (2013.01); *G06F 3/14* (2013.01); *G09G 3/20* (2013.01); *G06F 2200/1614* (2013.01);
(Continued)

(58) Field of Classification Search
CPC .... G06F 1/1615; G06F 3/0227; G06F 1/1616; G06F 1/1637; G06F 1/1643; G06F 1/1677; G06F 3/14; G06F 3/20; G06F 2200/1614; G06F 2300/023; G06F 2354/00; G06F 1/162; H04M 1/0206
USPC ........................................................ 345/156
See application file for complete search history.

(56) References Cited

U.S. PATENT DOCUMENTS

| | | | | |
|---|---|---|---|---|
| 5,729,219 A | * | 3/1998 | Armstrong | .......... G06F 3/03547 340/7.55 |
| 5,896,575 A | * | 4/1999 | Higginbotham | .......... G06F 1/16 455/557 |
| 6,481,851 B1 | * | 11/2002 | McNelley et al. | .............. 353/28 |

(Continued)

FOREIGN PATENT DOCUMENTS

| | | | | |
|---|---|---|---|---|
| JP | 2000-020209 A | * | 1/2000 | |
| JP | 2005316656 A | * | 11/2005 | |

(Continued)

OTHER PUBLICATIONS

Anonymous. "BlackBerry Style 9670 QWERTY flip". Mobile Reviews. Flare (Mar. 15-Apr. 15, 2011): 70-71.*

(Continued)

*Primary Examiner* — Julie Anne Watko

(57) ABSTRACT

An apparatus may include a first panel having a first user interface that includes a keyboard. The apparatus may also include a second panel coupled via a hinge to the first panel in a clamshell structure. The second panel may include a first display side to present information in a first display mode when the apparatus is arranged in an open position, and a second display side to present information in a second display mode when the apparatus is arranged in a closed position. Other embodiments are disclosed and claimed.

26 Claims, 12 Drawing Sheets

(52) U.S. Cl.
CPC ... *G09G 2300/023* (2013.01); *G09G 2354/00* (2013.01)

(56) References Cited

U.S. PATENT DOCUMENTS

| | | | | |
|---|---|---|---|---|
| 6,597,347 | B1* | 7/2003 | Yasutake | G06F 3/0338 178/18.01 |
| 6,839,101 | B2* | 1/2005 | Shima | 349/58 |
| 6,927,747 | B2* | 8/2005 | Amirzadeh | G06F 1/1601 345/102 |
| 7,821,780 | B2* | 10/2010 | Choy | G06F 1/1616 165/80.4 |
| 8,698,771 | B2* | 4/2014 | Lee | G06F 1/1643 345/173 |
| 8,854,802 | B2* | 10/2014 | Robinson | G06F 1/1615 349/74 |
| 2002/0037754 | A1* | 3/2002 | Hama et al. | 455/566 |
| 2002/0158999 | A1* | 10/2002 | Shima | G02F 1/133553 349/58 |
| 2004/0008191 | A1* | 1/2004 | Poupyrev et al. | 345/184 |
| 2005/0024339 | A1* | 2/2005 | Yamazaki | G06F 1/1616 345/169 |
| 2006/0187213 | A1 | 8/2006 | Su | |
| 2007/0131944 | A1 | 6/2007 | Hu et al. | |
| 2007/0291008 | A1* | 12/2007 | Wigdor | G06F 1/1613 345/173 |
| 2008/0084395 | A1* | 4/2008 | Dawson | G06F 1/1632 345/168 |
| 2009/0231662 | A1* | 9/2009 | Sorensson et al. | 359/273 |
| 2009/0256809 | A1* | 10/2009 | Minor | G06F 3/03547 345/173 |
| 2009/0298546 | A1* | 12/2009 | Kim | G06F 1/1616 455/566 |
| 2010/0142139 | A1 | 6/2010 | Szabolcsi | |
| 2010/0248808 | A1* | 9/2010 | Barker | G07F 17/3279 463/20 |
| 2010/0277439 | A1* | 11/2010 | Charlier | G06F 1/1616 345/176 |
| 2011/0163986 | A1* | 7/2011 | Lee | G06F 1/1692 345/173 |
| 2012/0105424 | A1* | 5/2012 | Lee | G09F 9/35 345/212 |
| 2012/0162270 | A1* | 6/2012 | Fleck et al. | 345/690 |
| 2012/0306740 | A1* | 12/2012 | Hoda | 345/156 |
| 2013/0113682 | A1* | 5/2013 | Heizer | G06F 3/1423 345/1.1 |
| 2013/0141373 | A1* | 6/2013 | Takuma | G06F 3/04883 345/173 |
| 2014/0009415 | A1* | 1/2014 | Nishida | G06F 3/04886 345/173 |
| 2015/0042539 | A1* | 2/2015 | Avrahami | G06F 3/1446 345/1.3 |
| 2015/0220299 | A1* | 8/2015 | Kim | G06F 1/1605 345/1.3 |

FOREIGN PATENT DOCUMENTS

| | | | |
|---|---|---|---|
| JP | 2008083510 A | * | 4/2008 |
| WO | 02071131 A3 | | 2/2003 |

OTHER PUBLICATIONS

TransWall: two-sided, touchable, and transparent display wall. Jul. 8, 2014. https://www.youtube.com/watch?v=1QdYC_kOQ_w (Flip and Spell screen shots taken Aug. 18, 2016).*

Wigdor et al. "LucidTouch: A See-Through Mobile Device". UIST'07 (Newport, RI), Oct. 7-10, 2007, TR2007-075.*

Shen et al. "Double-side Multi-touch Input for Mobile Devices". CHI 2009 ~ Spotlight on Works in Progress ~ Session 2 (Boston, MA), Apr. 4-9, 2009, p. 4339-4344.*

Otani. "Double-faced Touch Panel Display Debuts", Nikkei Technology Online (http://techon.nikkeibp.co.jp/english/NEWS_EN/20080829/157145/) Aug. 29, 2008 (retrieved Feb. 13, 2017).*

International Search Report and Written Opinion, Mailed Date: May 2, 2012, Application No. PCT/US2011/054253, Filed Date: Sep. 30, 2011, pp. 10.

Office Action received for Taiwanese Patent Application No. 101135103, mailed Aug. 25, 2014, 23 pages including 11 pages English translation.

* cited by examiner

CONVERTIBLE COMPUTING DEVICE

BACKGROUND

With the proliferation of electronic devices, including computing devices, communication devices, and portable entertainment devices, many types of hybrid devices that combine computing, communication, and/or entertainment functions have been developed. One class of hybrid device is the so-called convertible tablet device that can operate in a "notebook" mode and in a "tablet" mode. These devices typically have the form factor of a small portable computer and typically include a display panel that is connected to an input panel that includes a full keypad (QWERTY) and mouse functionality. In the notebook mode, the display panel and keypad are thus typically oriented similarly to a conventional notebook computer, where the display panel can be set at a convenient viewing angle with respect to the input panel and the keyboard is used to control information presented on the display panel. In order to operate in a tablet mode, such convertible tablet devices provide complex conversion mechanisms between the display panel and input panel that allow the display panel and input panel to stack together to form a flat tablet-like device where the display faces outwardly. In the tablet mode of operation, the display surface provides a user interface to receive input as in conventional tablet devices.

The present day convertible tablets combine the advantages of a tablet, including a touch interface with direct input, together with the advantages of a notebook computer, including a full QWERTY keyboard, a touch pad or similar device, and full blown operating systems that may require a mouse or trackpad for correct use. However, the popularity of convertible tablets has lagged in spite of the increased functionality afforded by such devices in comparison to conventional notebook computers or conventional tablet computers. One reason for the lagging adoption of convertible tablets may lie in the complexity of the conversion mechanisms for changing between notebook and tablet modes. Currently available convertible notebook computers burden the user with complex hinging mechanisms to convert from one mode to the other. In some cases, the user first opens the clamshell, then performs a twisting or rotation operation until the display faces in an opposite direction, followed by folding the display and input panel down into a single block. Other more complex conversion mechanisms exist, but these may be less reliable and may add a large manufacturing expense rendering the convertible tablet device uncompetitive.

Accordingly, there may be a need for improved techniques and apparatus to solve these and other problems.

DETAILED DESCRIPTION

Various embodiments involve a novel and inventive display and convertible tablet device based upon the display. The term "convertible tablet" as used herein, refers to an electronic device that can be used in at least two different modes, a "tablet mode," and a "notebook mode." The convertible tablet device may have two panels, such that in the tablet mode the two panels are disposed in a stack on top of one another. In the tablet mode, the display panel faces outwardly and may provide touch screen functionality as found in conventional tablets. In the notebook mode, the two panels may be arranged in an "open clamshell" configuration that is typical of a portable computer, such as a notebook, laptop, or other flat screen portable device.

Figure 1:
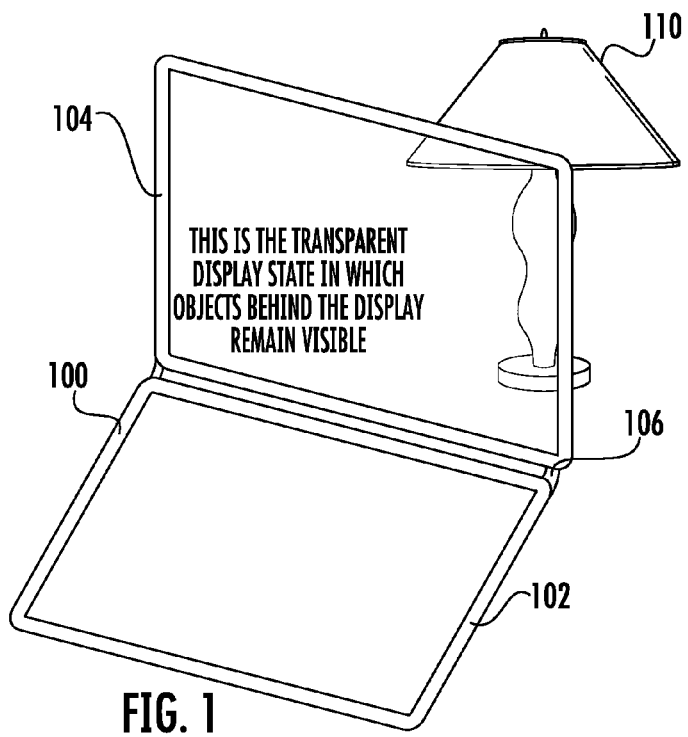
FIG. 1 depicts a scenario in an embodiment of a convertible tablet device.
Figure 2:
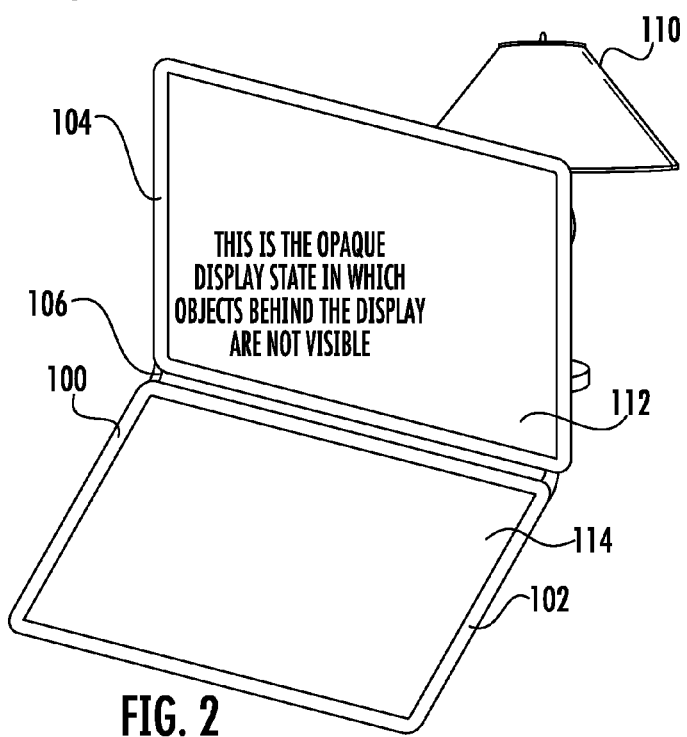
FIG. 2 illustrates another scenario of the device of FIG. 1.

FIG. 1 and FIG. 2 depict operation of an embodiment of a convertible tablet device 100. The portable tablet device 100 is arranged in a "clamshell" structure in which a lower panel, which is termed herein a "keyboard panel" 102, is coupled to an upper panel, which is termed a "display panel" 104, through a hinge 106. In various embodiments, the keyboard panel 102 may include an input device that contains a keyboard, trackpad, and/or other selection/navigation devices. The keypad panel may include various computing components such as processors, memory devices, and communication devices. The display panel 102 may include a display whose functions are detailed in the discussion to follow. As illustrated in FIG. 1, the convertible tablet device 100 is operating in a "notebook" mode in which the keyboard panel 102 is used to input information, such as through a keypad, mouse, microphone, or other devices common to known notebook computers. In typical operation, the keyboard panel 102 may be placed on a surface while the display panel 104 is rotated to a desired viewing angle for a user to conveniently view information displayed thereon. In addition to the use of the hinge 106, in other embodiments a display panel 102 may be coupled to the keyboard panel in another type of pivot structure, such as a central pivot point.

Figure 3:
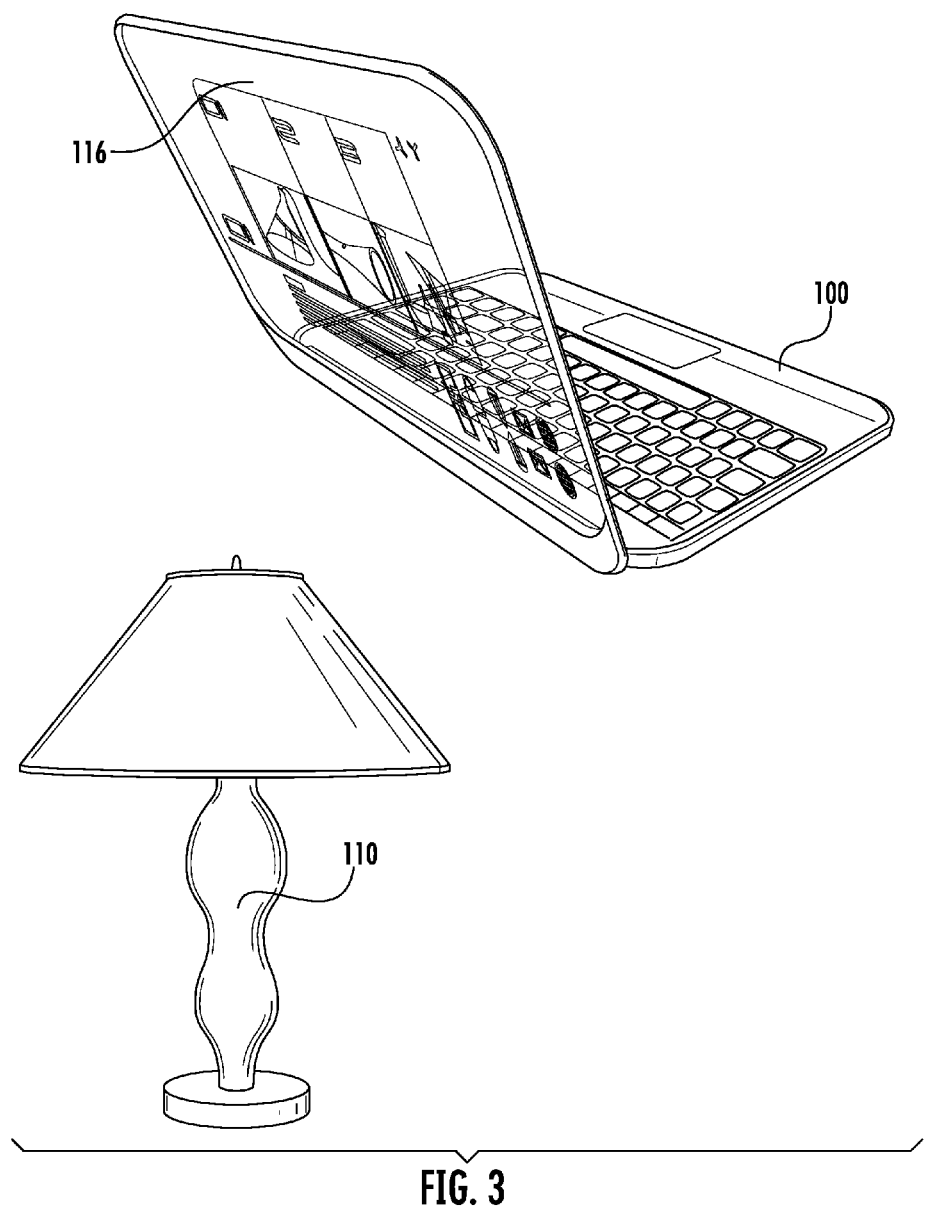
FIG. 3 presents another view of the device of FIG. 1.

In the example illustrated in FIG. 1 the display panel 104 includes a display that can operate in multiple modes. In a first mode, as shown in FIG. 1, the display panel 104 is arranged in a transparent state in which the display panel 104 is transparent to visible light. In various embodiments, the majority of the display panel 104 may be a display except for a bezel around the periphery. Accordingly, the term "display" may also be used to refer to the display panel of convertible tablet devices in the discussion to follow. When the convertible tablet device 100 is operated in a notebook mode and the display panel 104 is operated in a transparent state, a user may view information that is presented on the display panel 104, which may be provided by a known display component, such as a set of layers that comprise a transparent optical light emitting diode (OLED) display. Accordingly, the user may see information presented on the display panel 104 while also being able to view objects behind the display, such as lamp 110. In addition, as illustrated in FIG. 3, which presents a back view of the convertible tablet device 100, information displayed on display panel 104 may be viewed by a user positioned behind the display, at the location of lamp 110, for example.

Consistent with the present embodiments, the convertible tablet device 104, when operated in a notebook configuration, may also change the operating state of the display panel 104 to an opaque state. FIG. 2 illustrates operation of the convertible tablet device 104 in a notebook/opaque display mode in which the display panel 104 and keyboard panel 102 are arranged in an open position as in FIG. 1 that is typical of operating conventional notebook, laptop, or netbook computers. In the scenario depicted in FIG. 2, the display panel 104 is operated in an opaque state in which visible light does not transmit through the display panel 104. Thus objects, such as lamp 110, may be obscured from the user of convertible tablet device 100 if the display panel 104 lies between the user and such object. The flexibility and advantages afforded by these different modes of operation are detailed in the discussion to follow.

Figure 4:
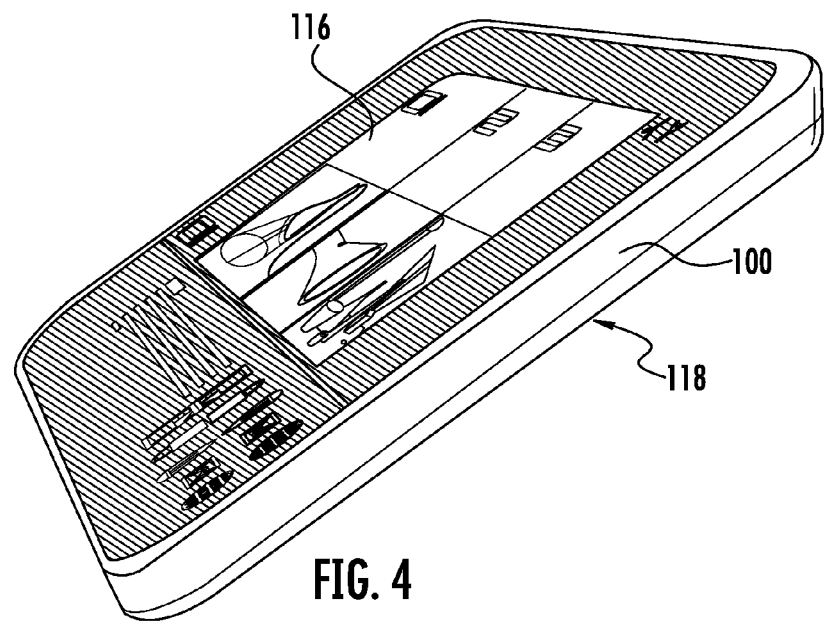
FIG. 4 depicts a perspective view of an embodiment of a convertible tablet device.

The convertible tablet device 100 may also be operated in a tablet mode, as illustrated in FIG. 4. In particular, FIG. 4 depicts a perspective view generally from the side, showing one embodiment of the convertible tablet device 100 when the device is arranged in a closed position for operating in tablet mode. In this mode, the clamshell structure of the convertible tablet device 100 is folded shut. Referring also to FIG. 2, consistent with the present embodiments, the tablet mode may be achieved by rotating the display panel 104 downwardly via hinge 106 until a front display surface 112 (also termed the "B" surface) comes to rest on the keyboard surface 114 (also termed the "C" surface) of keyboard panel 102. Referring also to FIG. 3, in the tablet mode illustrated in FIG. 4, the back display surface 116 (also termed the "A" surface) of the display panel 104 comes to rest in a position such that the back display surface 116 faces outwardly towards a user, when the bottom surface (also termed the "D" surface) 118 of the convertible tablet device 100 is rested on a surface or held by the user.

In the tablet mode of operation, the back display surface 116 performs the role of a display and user interface. Accordingly, the back display surface 116 may have touch screen functionality and may perform other known functions of a conventional touch screen device, such as a tablet device. It will be readily appreciated that the convertible tablet device 100 provides advantages over conventional "single mode" devices, such as tablet devices and notebook devices. In particular, the convertible tablet device 100 affords the convenience and responsiveness of a touch screen device that cannot be supplied by conventional notebook devices, while the convertible tablet device 100 may also provide the full functionality of a notebook computer including a keyboard, trackpad, navigation devices, indicating devices, and operating system not available in tablet devices. In addition, in contrast to known tablet/notebook convertible devices, the convertible tablet device 100 provides a simple mechanism for changing between tablet and notebook modes. In particular, the conversion between notebook and tablet modes takes place by opening or closing the clamshell, that is, by mere rotation of the upper and lower panels with respect to one another, similar to the action performed when opening or closing a conventional notebook or laptop computing device, flip phone or portable gaming device.

This provides a marked advantage over the known convertible devices that each involve a more complex mechanical movement to shift between operating modes. In addition, because the convertibility between modes for convertible tablet device 100 rests upon a simple hinge 106, the reliability and longevity of the convertible tablet device 100 may exceed that of known convertible devices.

Figure 5:
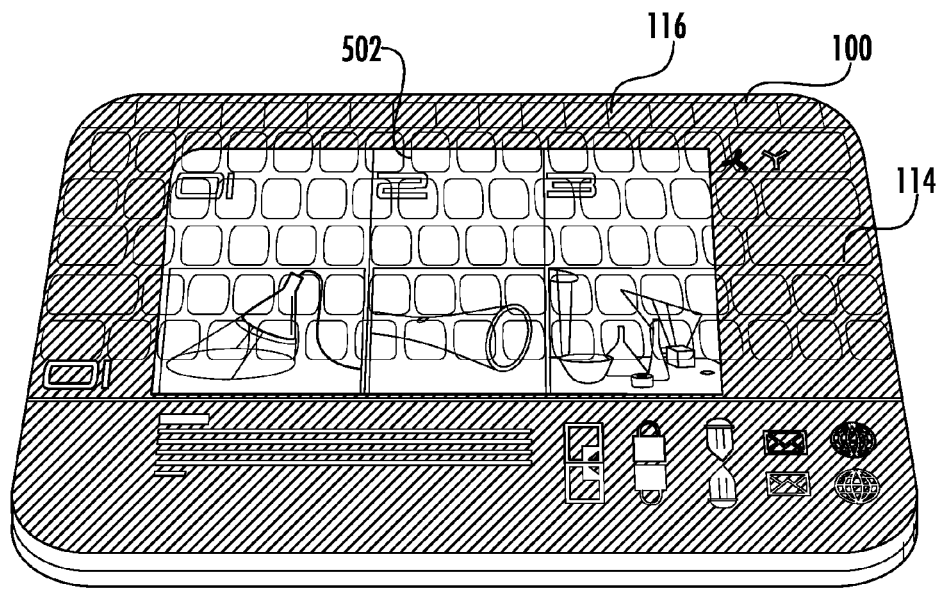
FIG. 5 depicts a front perspective view of the device of FIG. 4.

FIG. 5 depicts a front perspective view of the convertible tablet device 100, illustrating the appearance of exemplary display information presented to a user when the device is used in tablet mode. As noted earlier, and detailed below, the display panel 104 may include a transparent optical light emitting diode display layer(s) that can generate images which are formed from light emitting elements set against a transparent background. The transparent OLED display layer may itself include multiple layers, such as glass layers, transparent conductor layers, and LED layers, as are known in the art. Consistent with various embodiments, the display panel 104 may include additional layers that may modify the output of the OLED display layers. In various embodiments, the additional layers are arranged in such a manner that they permit light emitted from the transparent OLED layers to exit the display panel 104 at least in one direction, as described below. In particular, the additional layers may be arranged such that the additional layers serve to attenuate light emitted from the OLED layers toward the display back surface 116 when the display panel 104 is in an open position, but transmit light emitted toward the display back surface when the display panel 104 is in a closed position. Accordingly, when the display panel 104 is folded shut onto keyboard panel 102 for operation in tablet mode, images generated by the display panel 104 are still visible to a user, as illustrated by image 502 in FIG. 5.

As further depicted in FIG. 5, when the convertible tablet device 100 is folded shut for use in the tablet mode, in addition to any information presented on the display panel 104, the keyboard surface 114 of the keyboard panel 102 may be visible through the display panel 104, which rests on top of the keyboard surface 114. Consistent with various embodiments, the keyboard surface 114 may provide a low reflectivity surface, and may therefore have a dark appearance that enhances the viewability and legibility of information presented on a display of the display panel 104. Thus, a black or dark grey keyboard surface 114 may be provided to enhance contrast to the image 502 formed on the transparent display of the display panel 104, as shown in FIG. 5.

In order to facilitate proper viewing in both tablet and notebook modes, the convertible tablet device 100 may be arranged to change the orientation of images presented on the display panel 104 when the convertible tablet device 100 between tablet and notebook modes of operation. In some embodiments, the convertible tablet device 100 may be equipped with a switch or other device that can be engaged to switch the image orientation, while in other embodiments, the image orientation may switch automatically. For example, the convertible tablet device 100 may include a sensor or other means of detection that is operable to place images in a first orientation when the convertible tablet device 100 is folded shut, and is operable to place the images in a second orientation when the convertible tablet device 100 in unfolded and placed in a notebook configuration. In some embodiments, the switching between a first and second image orientation may take place when the display panel 104 and keyboard panel 102 form a predetermined angle or when rotation of the display panel with respect to the keyboard panel is detected. In still further embodiments, the convertible tablet device 100 may be operable to both automatically change image orientation based upon the positioning of display panel 104 and keyboard panel 102, and may also be equipped for manual changing of the image orientation.

Figure 6:
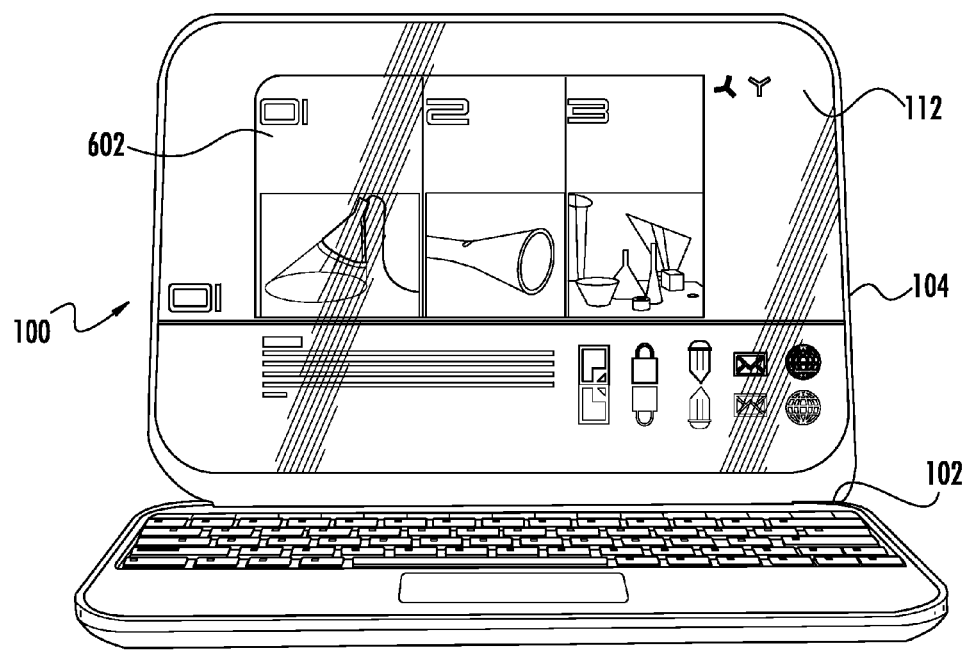
FIG. 6 depicts a scenario of an exemplary convertible tablet device.

FIG. 6 depicts a scenario in which the convertible tablet device 100 is generally arranged in a notebook mode in which the display panel 104 and keyboard panel 102 form an open clamshell structure. In the scenario of FIG. 6, the front display surface 112 faces outwardly and presents the image 602 in an orientation that can be properly viewed by a user positioned in front of the keyboard panel 102. As noted previously, and consistent with the present embodiments, when the convertible tablet device 100 is operated in notebook mode, the display panel 104 may operate in different states, including a transparent state or an opaque state.

If the user desires to fold the convertible tablet device 100 shut and switch to a tablet mode of operation, without disengaging from a current application, an image presented on the display panel 104 of the convertible tablet device 100 may be switched in orientation from a first orientation used for the notebook mode to a second orientation used for the tablet mode. In this manner, when the back display surface 116 becomes the surface facing the viewer in the tablet mode, the orientation of the image may appear the same as that in the notebook mode. This avoids problems such as having the image appear upside down/reversed when the display panel 104 and keyboard panel 102 are folded together.

Figure 7:
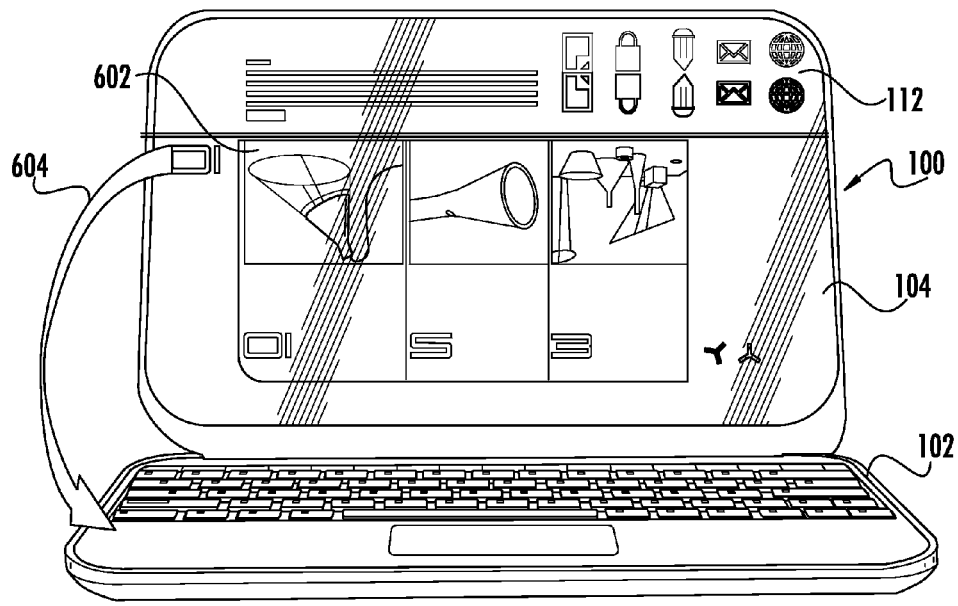
FIG. 7 depicts another scenario of the device of FIG. 6.

FIG. 7 depicts a scenario in which the display panel 104 and keyboard panel 102 are arranged in an open clamshell configuration as in FIG. 6. However, the image 502 displayed in FIG. 7 represents an upside down orientation of image 602. As noted above, this image reversal may be the result of an automatic or manual operation. Accordingly, if the display panel 104 is brought together with the keyboard panel 102, along the path 604, when viewed in the tablet mode, the initial image 602 may be transformed into the image 502 shown in FIG. 5, which has the same orientation to a user in the tablet mode as the image 602 presents in the notebook mode.

Figure 8:
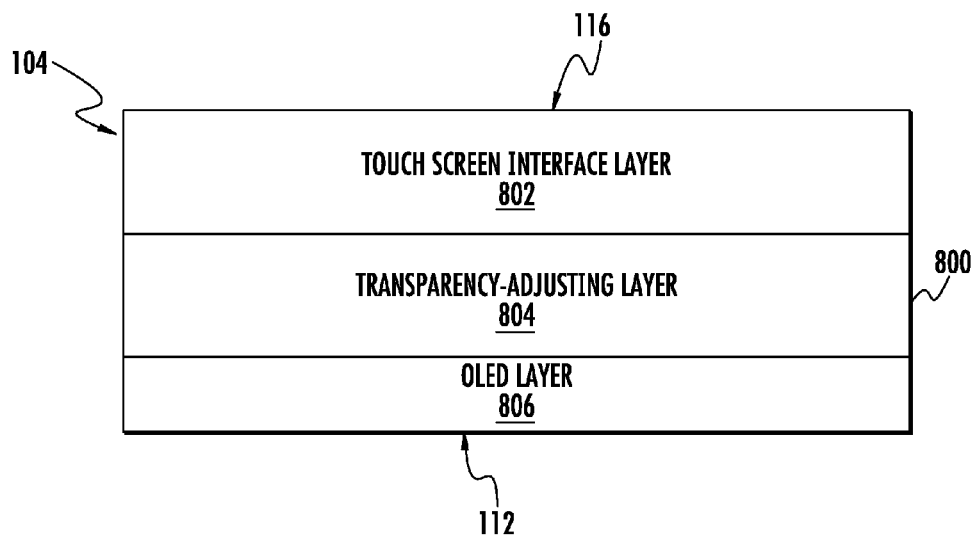
FIG. 8 depicts an exemplary layer stack.

FIG. 8 depicts an exemplary layer stack 800 that may be employed in an upper panel, such as display panel 104, to provide the display capabilities for operating a convertible tablet device in multiple modes, as discussed hereinabove. The layer stack 800 includes a touch screen layer 802 that is provided towards a back display surface 116. In some embodiments, the touch screen layer 802 may include multiple sub-layers that provide touch screen capability using known technologies. For example, the touch screen layer 802 may include a capacitive touch device that itself includes a transparent conducting layer, such as indium tin oxide (ITO) or similar materials. Referring also to FIG. 4, when the display panel 104 is folded shut for operation in tablet mode, the bottom surface 118 of keyboard panel 102 may rest on a user's hand, lap, or on a support surface (not shown). In this manner, the back display surface 116 faces upwardly or outwardly and thus provides accessibility to the touch screen layer 802, which may be manually engaged to perform desired operations in tablet mode.

The layer stack 800 further includes a transparency-adjusting layer 804 that is disposed between the touch screen layer 802 and the front display surface 112. In various embodiments, the transparency-adjusting layer 804 may be based upon currently available technology. Consistent with some embodiments the transparency-adjusting layer 804 may be an electrochromic layer (EC), a liquid crystal display (LCD) layer, or a combination of EC and LCD layers. In addition, as will be readily appreciated by those of ordinary skill in the art, the individual EC or LCD "layer" each may comprise multiple layers. The function and principle of operation of EC and LCD layers is well known, but will be reviewed briefly below.

As is well known, an EC device is a device based upon an active electrochromic layer or region that can reversibly change color and/or change opacity by injection or removal of charge in the electrochromic material. In current commercial applications, a switch or similar device may be used to adjust the transparency of a structure that may be highly transparent in an unaltered state, such as various types of window glass. When an electrochromic layer is added to glass layers of a window, an electric switch that connects the layers to a charge supply may typically adjust transparency from clear to opaque or to various levels between opaque and clear.

An applied voltage may serve to inject charge or remove charge from the electrochromic layer, thereby changing the color of the layer. In many cases, the reflectivity changes, such that the total amount of light transmitted through a window is drastically reduced. In present day electrochromic windows, a multi-layer assembly may be sandwiched between multiple layers of glass. Two outside layers of an electrochromic system may be transparent electronic conductors, such as ITO. In addition, an electrochromic layer, counter electrode, and ion conductive layer area are located between the ITO layers. Reversing the voltage when the window is in a darkened state moves ions from the electrochromic layer back to the counter-electrode layer, restoring the device to its previous clear state. Known electrochromic materials, such as tungsten oxide, are ionic compounds that are highly transparent when the charge is removed. Thus, a window stack or computer display having an electrochromic layer(s) sandwiched between typical glass layers may be highly transparent in its "clear" state, such as 70% or more transparent.

In embodiments where transparency-adjusting layer 804 is an LCD "layer" a liquid crystal layer may be enclosed by two transparent conductive layers. When a voltage is applied, the orientation of liquid crystal molecules may be altered, thereby changing the transparency of a panel that includes the liquid crystal layer. Accordingly, in embodiments of the display panel 104 that use an EC and/or LCD "layer" for the transparency-adjusting layer 804, it will be understood that the transparency adjusting layer 804 includes multiple sub-layers.

As further shown in FIG. 8, the layer stack 800 includes an OLED layer 806, which may be a set of layers that are arranged to produce a transparent OLED device. In other words, the OLED layer 806 generally encompasses a set of layers, none of which are opaque so that light emitted from optical light emitting diodes of the OLED layer 806 may be transmitted out of the OLED layer 806 and through front display surface 112 and back display surface 116, depending on the state of transparency-adjusting layer 804.

Figure 9:
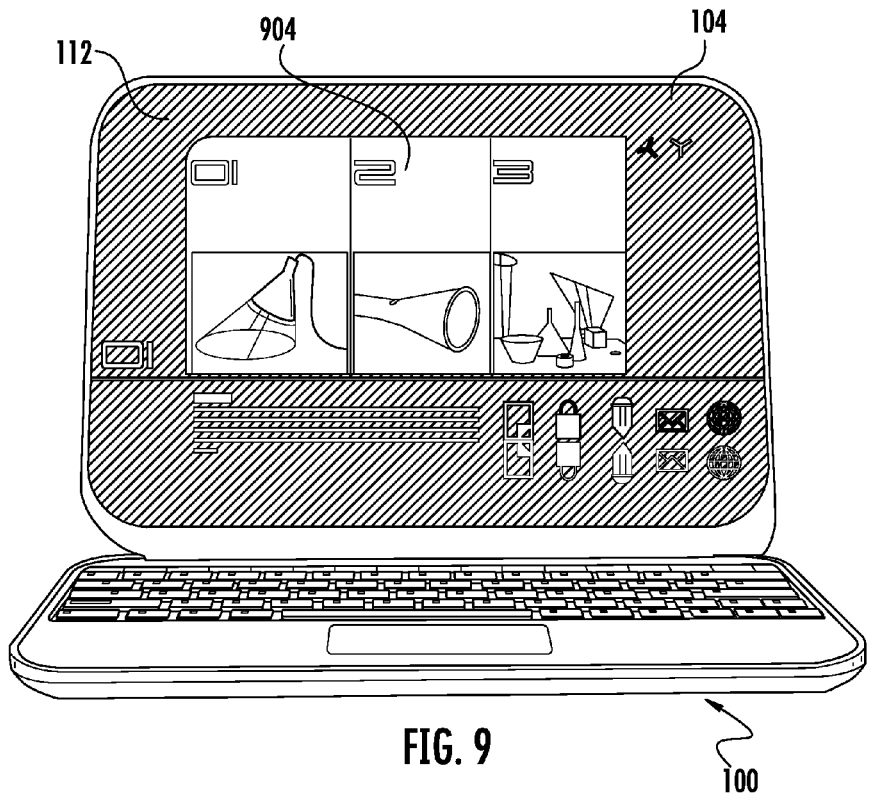
FIGS. 9 and 10 depict a front view and back perspective view, respectively, of a convertible tablet device embodiment.
Figure 10:
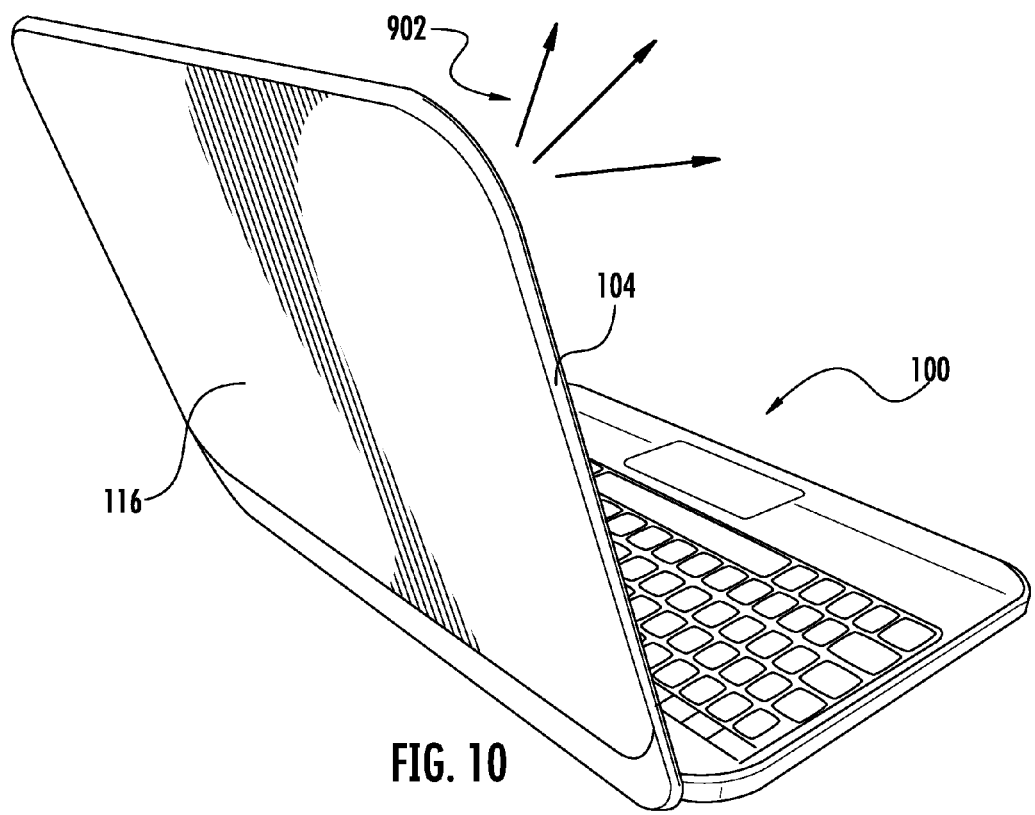
Figure 11:
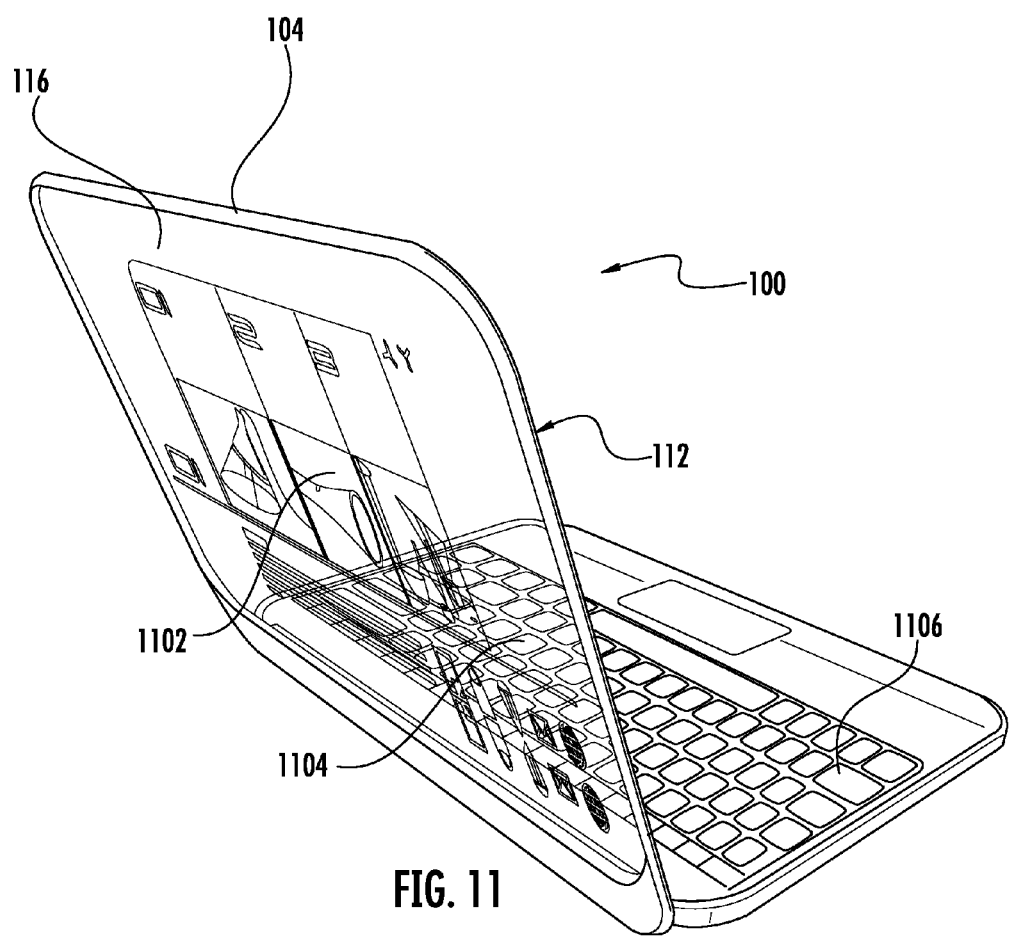
FIG. 11 depicts another scenario of the convertible tablet device of FIGS. 9 and 10.

Consistent with the present embodiments, the viewing state of a display that includes the layer stack 800 can be controlled by controlling the state of the transparency-adjusting layer 804. FIGS. 9-11 provide exemplary views of a convertible tablet device 100 in the notebook mode that highlight the effect of the transparency-adjusting layer 804. FIGS. 9 and 10 depict a front view and back perspective view, respectively, of the convertible tablet device 100 when operated in an opaque viewing state. In this state, the transparency-adjusting layer 804 is set to produce an opaque or non-transmitting state, so that light incident on the back display surface 116 is not transmitted through the display panel 104. Additionally, light incident on the front display surface 112 is not transmitted through the display panel 104. In this manner, the display panel 104 acts as an opaque object that screens a viewer from either side of the display panel 104 from seeing objects on the other side of the display panel 104. In addition, as apparent from FIG. 8, any light emitted from the OLED layer 806 in a direction towards the back display surface 116 is attenuated by the transparency-adjusting layer 804, so that a viewer cannot view the displayed image from behind the convertible tablet device 100. By the same token, because the OLED layer 806 is disposed between the front display surface 112 and transparency-adjusting layer 804, any light emitted from the OLED layer 806 in an outward direction towards the front display surface 112 is not attenuated by the transparency-adjusting layer 804. Accordingly, even though the transparency-adjusting layer 804 is set to block light, much of the light 902 emitted from the OLED layer 806 is transmitted out of the display panel 104 via the display front surface 112 and is viewable as the image 904. In various embodiments the transparency-adjusting layer 804 may provide enhanced contrast to the image formed by the OLED layer. For example, in an embodiment in which the transparency-adjusting layer 804 is an EC layer system, the injection of charge into the transparency-adjusting layer 804 may not only lower the transparency of the display panel 104, but may also change the reflectivity, which may add to the contrast of the image 904.

As noted, FIG. 11 depicts a back perspective view of the convertible tablet device when the display panel 104 is operated in a transparent state. In this case, the transparency-adjusting layer 804 may be set to provide maximum transparency. Accordingly, in the state depicted in FIG. 11, the image 1102 is formed by OLED elements, which emit light in a pattern that is perceived by a user to create an image. In portions 1104 of the display panel 104 that lie outside of the light emitting OLED elements, the display panel 104 remains substantially transparent. Accordingly, the image 1102 presented in the transparent state may have less clarity or sharpness as compared to the image 904. However, one advantage provided by the transparent state is that a user may receive more visual input from objects located behind the display panel 104, which may be desirable under various circumstances. In addition, the transparent state may operate as a sharing mode, in which others may be apprised of what tasks are being performed by a user of the convertible tablet device 100, for example, by glancing at the back of the display panel 104 when it is operated in the transparent state. As suggested by FIG. 11, the image 1102 when viewed from the back of the display panel 104 may be reversed from the normal image presented to a user in front of the display panel 104. Accordingly, the information presented on the display panel 104 may not be completely understood by persons located in back of the display panel. Nevertheless, basic information may in some cases readily be gleaned by glancing at the image 1102 even from the perspective of FIG. 11. Moreover, when the user desires privacy, the transparent state can be discontinued, returning the user to the opaque state as in FIG. 9.

Consistent with further embodiments, a convertible tablet device may be arranged to allow touch screen interaction with the back display surface 116 when the convertible tablet is in an open position. Referring again to FIGS. 5 and 8, it is noted that the touch screen interface layer 802 may typically be provided on the back display surface 116. This allows a user to engage the back display surface 116, which faces outwardly when the display panel 104 is closed upon the keyboard panel 102. The convertible tablet device 100 may also be operable to receive user input on the back display surface 116 even when the display panel 104 is positioned as shown in FIG. 11. Thus, in one scenario, a first user may operate the convertible tablet device 100 in a notebook configuration in which user input is entered through a keyboard 1106. The results of the user input may be displayed as visual content including an image 1102. However, a second user may engage the back display surface 116 to interact with the image 1102 through the touch screen interface layer 802. It will be appreciated that operation in such a hybrid mode where the convertible tablet device may operate in a touch screen and keyboard mode simultaneously may require additional operating system-level software.

However, in an additional mode, the convertible tablet device 100 may be operated in a touch screen mode on both front display surface 112 and back display surface 116 while in an open position. This may facilitate collaborative interaction where two different users located on either side of the convertible tablet device 100 can provide input to the display in a back-and-forth manner.

Figure 12:
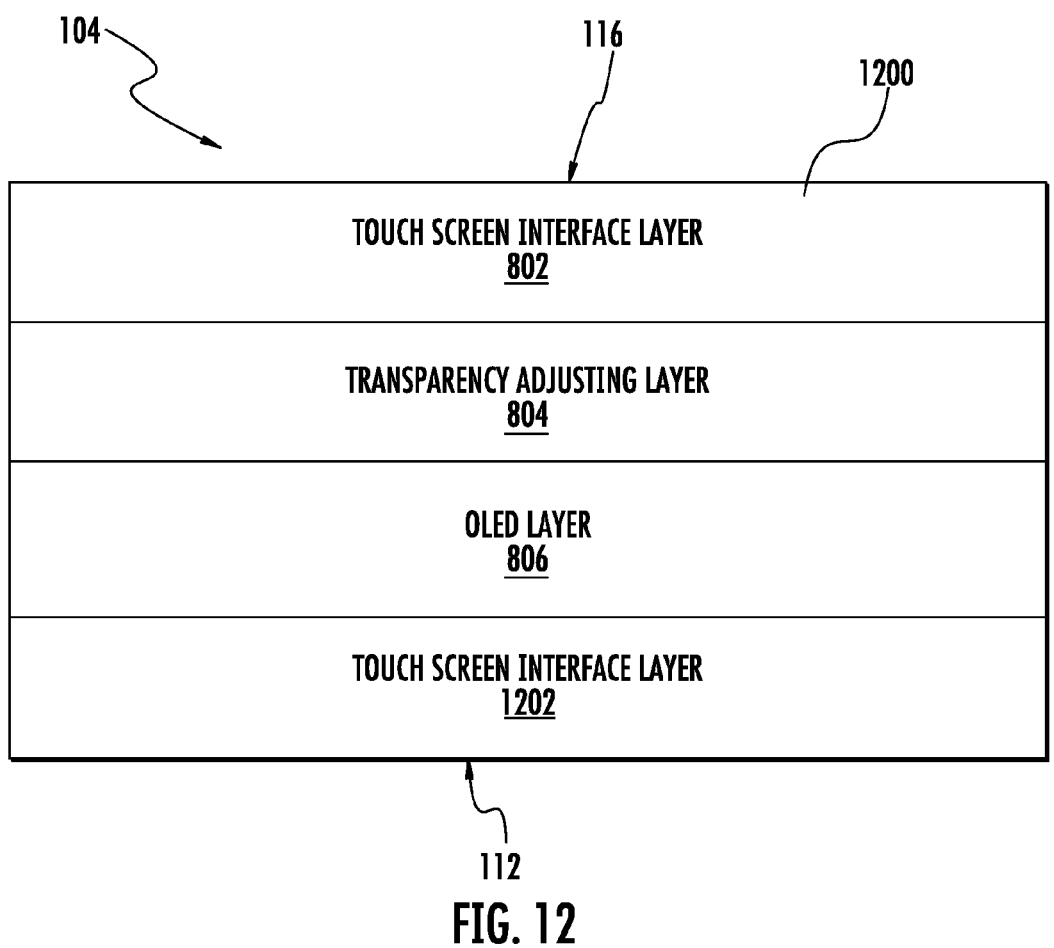
FIG. 12 depicts another exemplary layer stack.

FIG. 12 depicts an exemplary layer stack 1200 that may facilitate the use of the convertible tablet device as a touch screen device while in an open position. As illustrated, the layer stack 1200 includes the touch screen interface layer 802 proximate the back display surface 116, as well as a transparency-adjusting layer 804 and OLED layer 806, all of which layers are arranged in the same configuration as in layer stack 800. In addition, the layer stack 1200 includes a touch screen interface layer 1202 proximate the front display surface 112. This layer provides an interface to a user for engaging the display panel 104 from the front display surface 1200 when the display panel 104 is raised in the open clamshell position typical of notebook operation.

Consistent with additional embodiments, a convertible tablet device may have a feature, such as a button, switch or softkey that allows a user to set a touchscreen mode of operation even when the display panel 104 is raised to the open position as in FIG. 11. In this manner, users may touch either the front display surface 112 or back display surface 116 to enter input. In one example, the convertible tablet device 100 may be operable to switch the orientation of an image so that a user engaging either front display surface 112 or back display surface 116 may view an image in the same relative orientation. Accordingly, a first user may view a first image presented in a first orientation that is appropriate for viewing from the front display surface 112. A second user located behind the display panel 104 may observe the first image, which appears to be reversed. The second user may subsequently perform a swiping motion along the back display surface 116, which causes the first image to reverse its orientation from left to right on the display panel 104. The second user may additionally enter other input through the back display surface 116. Subsequently, the first user may engage the front display surface 112, which also has touch screen capability, so that the displayed images once more reverse themselves in orientation, thereby allowing the first user to view the displayed images in the proper orientation and so forth.

If the convertible tablet device is subsequently closed into a tablet configuration while an application is active and after being used in a touch screen mode while in the notebook (open clamshell) configuration, the image presented on the back display surface may once more perform a re-orientation operation. In this case, the nature of the image reorientation operation may depend upon the orientation of the image before the convertible tablet device is closed. Thus, if the image is properly oriented for viewing form the front display surface 112, the image may flip from top to bottom of the display panel 104, as noted previously. However, if the image is oriented for viewing from the back display surface 116 immediately prior to closing the convertible tablet device, the image may flip from top to bottom and may reverse from right to left, which is equivalent to undergoing a 180 degree rotation.

Referring once more to FIGS. 8 and 12, it is noted that in the tablet mode, the back display surface 116 is presented outwardly to the user. In addition, the transparency-adjusting layer 804 is disposed between the OLED layer 806 and the back display surface 116. Accordingly, in order for the user to view images formed by the OLED layer 806 when the display panel 104 is in the tablet configuration, the transparency-adjusting layer 804 should not be set to block all the light emitted from the OLED layer 806, since that would prevent a user from seeing any image. Thus, if a user is operating in notebook mode with the transparency-adjusting layer 804 set to produce an opaque viewing state, the transparency-adjusting layer 804 may be switched back to a transparent state when the display panel 104 is closed upon the keyboard panel 102.

It is also notable that in the layer stack embodiments presented in FIGS. 8 and 12, there is no transparency-adjusting layer between the OLED layer 806 and front display surface 112. Accordingly, when a convertible tablet device containing either layer stack 800 or 1200 is placed in a tablet mode, since the transparency-adjusting layer 804 is set to a transparent state, the display panel 104 may be transparent such that any enhanced contrast to an image formed by the OLED layer 806 is provided by the keyboard surface 114.

In order that the keyboard surface provide proper contrast for the display panel 104 when the latter is arranged in the tablet mode, the keyboard may be operable to change its appearance when changing between the notebook and tablet modes.

Figure 13:
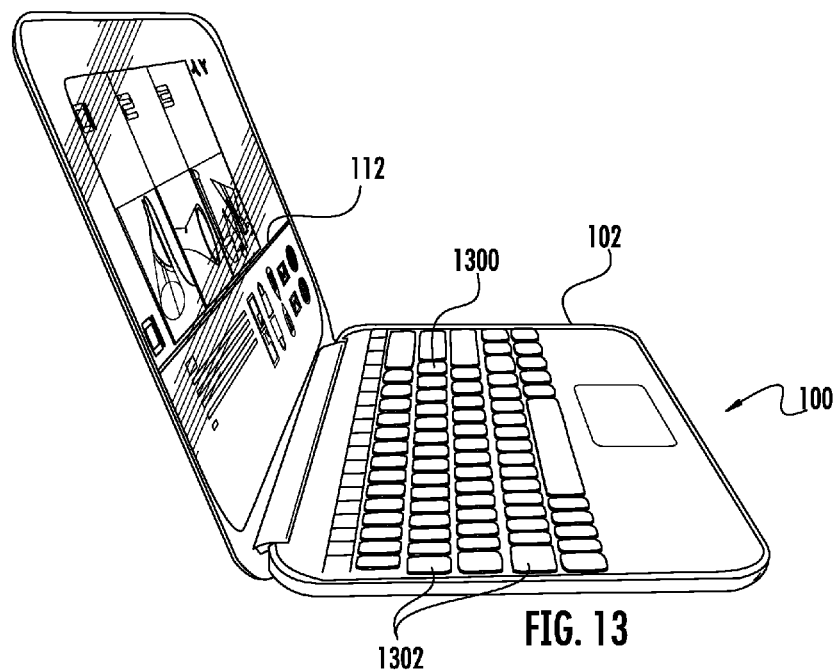
FIG. 13 depicts a scenario of a convertible tablet device according to one embodiment.

FIG. 13 depicts a scenario in which the convertible tablet device 100 is operating in a notebook mode with user input conducted via the keyboard 1300 provided in the keyboard panel 102. In this mode, icons 1302 provided on keys in the keyboard 1300 are lit so that a user can more easily identify different keys.

Figure 14:
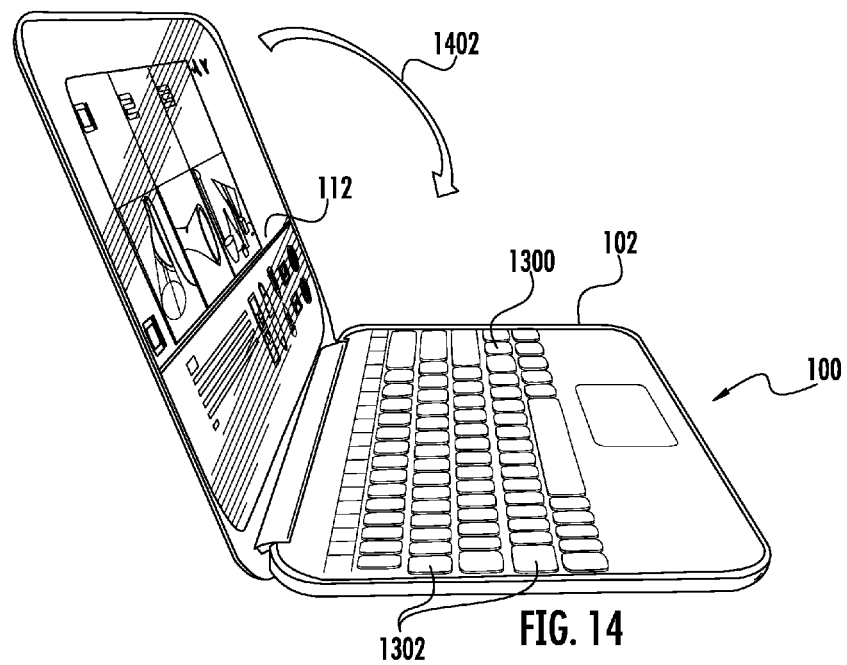
FIG. 14 depicts a further scenario of the device of FIG. 13.

FIG. 14 depicts a further scenario in which the convertible tablet device 100 is to rotate downwardly along path 1402 on top of keyboard panel 102 for operation in tablet mode. In this case, the icons 1302 are turned off. In one embodiment, the convertible tablet device 100 may include a sensor that detect when the convertible tablet device 100 is closing or in a closed position. Thus, when the display panel 104 is rotated toward the keyboard panel 104 around the path 1402 as illustrated, the convertible tablet device 100 may determine that a tablet mode is to be initiated and may extinguish any keyboard lights that are currently illuminated. This is also shown in the tablet mode scenario depicted in FIG. 5. In this manner, the keyboard surface 114 may present a darker surface that does not provide light that may travel through the display panel 104 and conflict with images formed by the OLED layer of the display panel 104, which, as noted previously, may be transparent to light during operation in the tablet mode.

Figure 15:
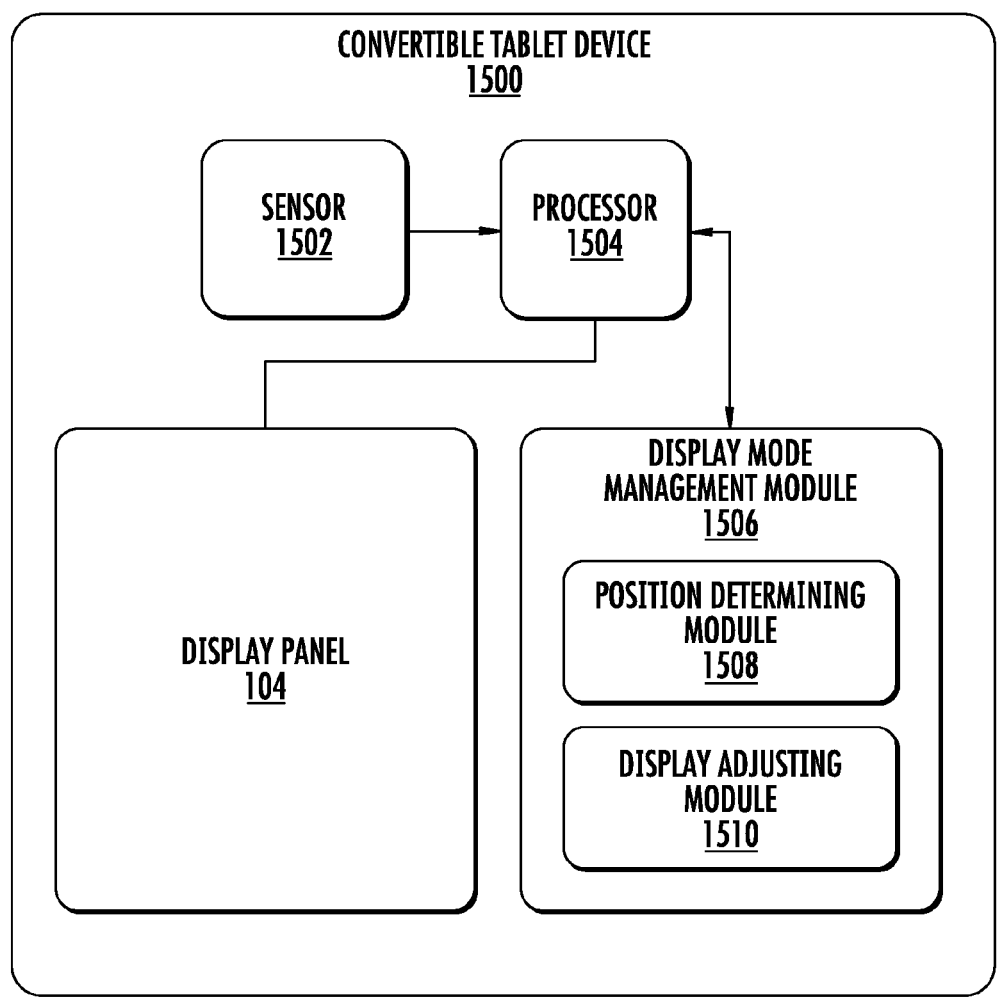
FIG. 15 depicts a block diagram of an embodiment of a convertible tablet device.

FIG. 15 depicts a block diagram of an embodiment of a convertible tablet device 1500. The convertible tablet device 1500 includes a sensor 1502, processor 1504, display panel 104, and display mode management module 1506. The convertible tablet device 1500 may include other features including memory devices, RF transceivers, input/output devices, and other components. The sensor 1502 may comprise multiple a sensor system that includes multiple sensors and other elements to provide information to the processor 1504, including information related to the position and/or motion of various components of the convertible tablet device 1500, including the aforementioned display panel 1504 and a keyboard panel. The display mode management module 1506 may employ the position determining module 1508 to determine current status of various components based upon information forwarded to the processor. This status may include the relative positions of the display and keyboard panels. For example, the position determining module 1508 may determine when the convertible tablet device 1500 is in an open position or in a closed position. The status may also include determination of relative motion of the display panel 104. For example, the position determining module 1508 may determine when the display panel 104 is being opened or closed onto a keyboard panel based upon information received from sensor 1502. The display mode management module 1506 may employ the display adjusting module 1510 to adjust operation of various components of the convertible tablet device including the display panel 104 and a keyboard panel (not shown). The display adjusting module 1510 may act based on information determined by the position determining module or information that is manually input by a user. In this manner, features such as the transparency of the display panel 104, the orientation of an image presented on display panel 104, and the brightness of a keyboard panel, among other features, may be adjusted as appropriate.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 16:
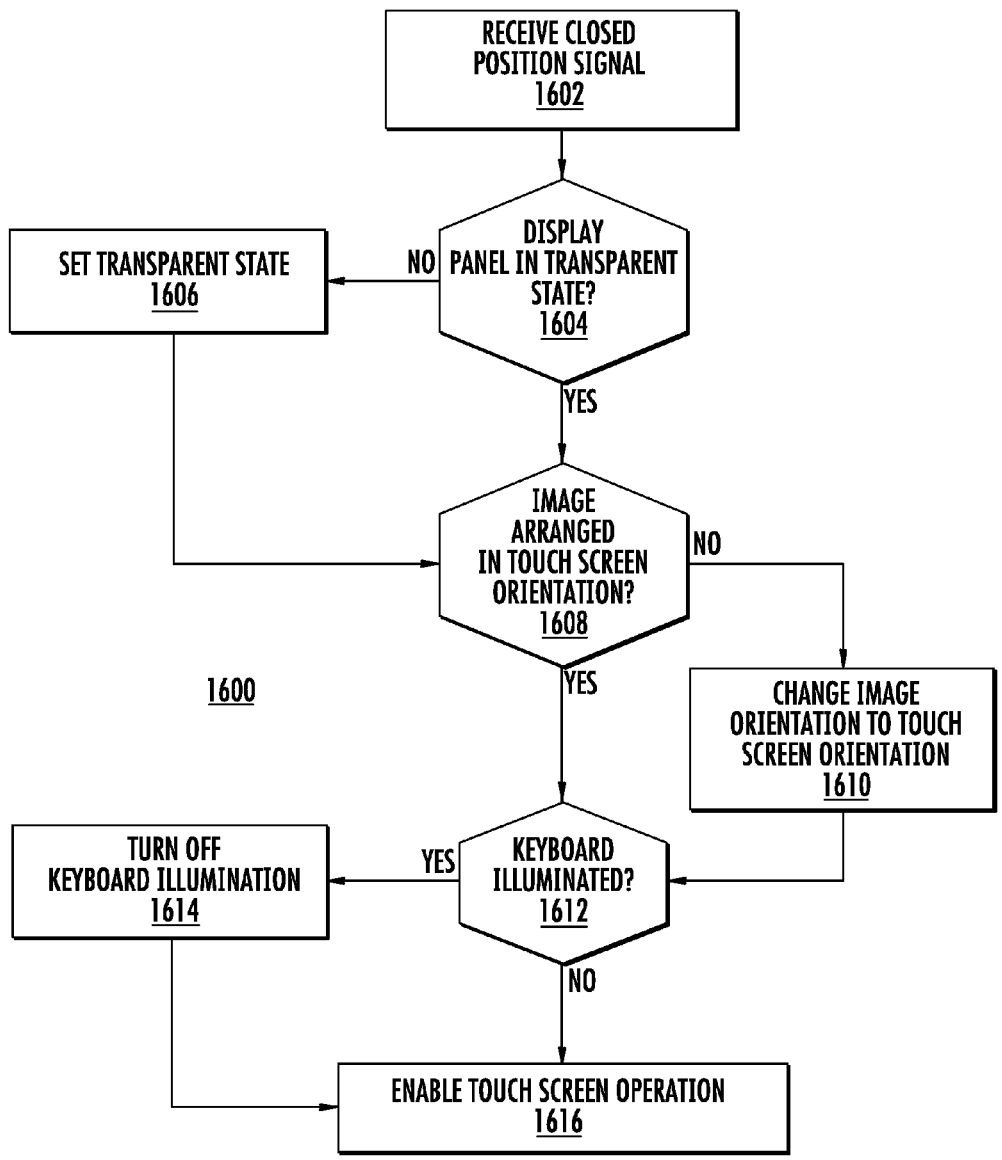
FIG. 16 presents an exemplary logic flow.

FIG. 16 presents an exemplary logic flow 1600. At block 1602, a closed position signal is received. The closed position signal may indicate that a display panel and keyboard panel of a convertible tablet device are in a closed clamshell position.

At block 1604 a determination is made as to whether the display panel is set to a transparent state in which light may be transmitted through the back surface of the display panel. If the display is not in the transparent state, the flow proceeds to block 1606.

At block 1606, the display panel is set to a transparent state. The setting may involve sending instruction signals to a controller to reverse a current state of a transparency-adjusting layer in the display panel. After block 1606, the flow proceeds to block 1608.

If, at block 1604, it is determined that the display panel is currently in a transparent state, the flow moves directly to block 1608. At block 1608, a determination is made as to whether the image is in a touch screen orientation. The touch screen orientation may correspond to an image orientation on a display panel in which the image appears to have a proper when viewed through the back surface of the display panel. If the current orientation of an image does not correspond to the touch screen orientation, the flow moves to block 1610.

At block 1610, the image orientation of the display panel is adjusted to conform to the touch screen orientation. The flow then proceeds to block 1612.

If, at block 1608, it is determined that the current image orientation does correspond to the touch screen orientation, the flow moves directly to block 1612. At block 1612, it is determined whether a keyboard on the convertible tablet device containing the display panel is illuminated. If the keyboard is illuminated the flow moves to block 1614.

At block 1614, the keyboard illumination is turned off. The flow then proceeds to block 1616.

If, at block 1612, it is determined that the keyboard is not illuminated, the flow moves directly to block 1616. At block 1616, touch screen operation of the display panel and device containing the display panel is enabled.

Figure 17:
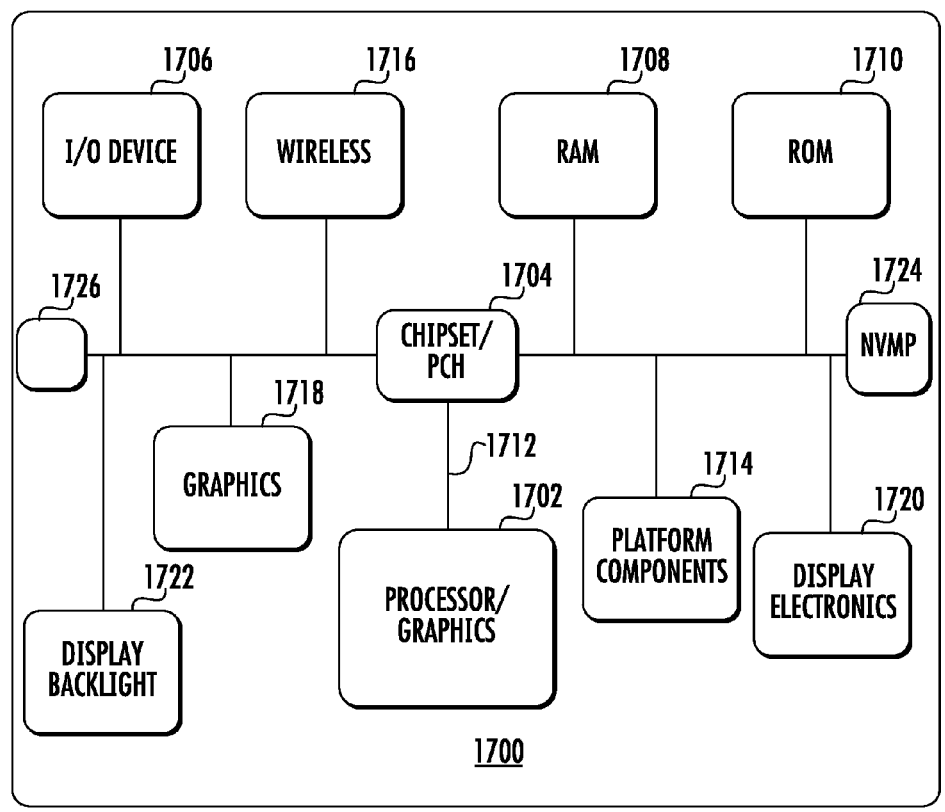
FIG. 17 is a diagram of an exemplary system embodiment.

FIG. 17 is a diagram of an exemplary system embodiment and in particular, FIG. 17 is a diagram showing a platform 1700, which may include various elements. For instance, FIG. 17 shows that platform (system) 1710 may include a processor/graphics core 1702 which may include an applications processor, a chipset/platform control hub (PCH) 1704, an input/output (I/O) device 1706, a random access memory (RAM) (such as dynamic RAM (DRAM)) 1708, and a read only memory (ROM) 1710, display electronics 1720, display backlight 1722, non-volatile memory port (NVMP) 1724, antenna 1726, and various other platform components 1714 (e.g., a fan, a crossflow blower, a heat sink, DTM system, cooling system, housing, vents, and so forth). System 1700 may also include wireless communications chip 1716 and graphics device 1718. The display electronics may include a liquid crystal display (LCD) screen, touch screen display, or other display. The I/O device 1706 may include a keyboard, mouse, and/or speakers. The embodiments, however, are not limited to these elements.

As shown in FIG. 17, I/O device 1706, RAM 1708, and ROM 1710 are coupled to processor 1702 by way of chipset 1704. Chipset 1704 may be coupled to processor 1702 by a bus 1712. Accordingly, bus 1712 may include multiple lines.

Processor 1702 may be a central processing unit comprising one or more processor cores and may include any number of processors having aNY Number of processor cores. The processor 1702 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 1702 may be multiple separate processors located on separate integrated circuit chips. In some embodiments processor 1702 may be a processor having integrated graphics, while in other embodiments processor 1702 may be a graphics core or cores.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives.

These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
a processor,
a first panel having a first input device that includes a keyboard;
a second panel coupled via a hinge to the first panel, the second panel comprising a display panel operably coupled to the processor, the display panel comprising:
a first display side to present information in a first display mode when the apparatus is arranged in an open position; and
a second display side to present information in a second display mode when the apparatus is arranged in a closed position, the second panel arranged to provide a transparent display when the apparatus is in the open position such that an image is visible via the first display side and the second display side; and
a display adjusting module, at least a portion of the display adjusting module comprised in a software module, the display adjusting module to provide information to the processor to cause the display panel to present the image in one of a first orientation or a second orientation when the apparatus is arranged in the open position based on whether a swiping motion input is received from the first display side or the second display side, the display adjusting module to cause, via information provided to the processor, the display panel to:
present the image in the first orientation responsive to receiving the swiping motion input from the first display side and the apparatus is arranged in the open position, and
present the image in the second orientation responsive to receiving the swiping motion input from the second display side and the apparatus is arranged in the open position.

2. The apparatus of claim 1, the first panel comprising a QWERTY keyboard.

3. The apparatus of claim 1, the second panel comprising a transparent light emitting diode (TLED) display.

4. The apparatus of claim 3, the TLED display arranged to switch between a multiplicity of viewing states when in the open position, two or more viewing states providing a different level of display transparency.

5. The apparatus of claim 1, the first display side arranged to present information based on user input through the keyboard.

6. The apparatus of claim 1, the second panel comprising:
a transparent light emitting diode (TLED) layer to generate an image in the second panel; and
a transparency-adjusting layer to adjust a level of light transmitted through the second panel.

7. The apparatus of claim 6, comprising a touch screen interface layer disposed on the second display side, the transparency-adjusting layer being disposed between the touch screen interface layer and the TOLED layer.

8. The apparatus of claim 7, comprising:
a processor circuit; and
a display mode management module, at least a portion of the display mode management module comprised in the software module, the display mode management module to provide information to the processor to cause the display panel to automatically switch between the first display mode and second display mode when the apparatus is changed between the open and closed positions.

9. The apparatus of claim 7, comprising a second touch screen interface layer disposed on the first display side.

10. The apparatus of claim 6, the transparency-adjusting layer comprising an electrochromic layer, a liquid crystal display layer, or a combination of the two.

11. A system, comprising:
a keyboard panel to receive input to control the system through a keyboard;
a display panel coupled to the keyboard panel through a clamshell hinge and operable to:
present information in a first display mode when the keyboard and the display panel are in an open position and to present information in a second display mode when the keyboard and the display panel are in a closed position, the open or closed position based on one or more position signals, the display panel arranged to provide a transparent display when in the first display mode such that an image is visible via a first display side and a second display side, present the image, when in the open position, in a first orientation responsive to a swiping motion input signal indicating a swipe motion input from the first display side, and present the image, when in the open position, in a second orientation responsive to the swiping motion input signal indicating the swipe motion input from the second display side; and a processor operably coupled to the display panel, the processor to:
receive the one or more position signals indicating the open or closed position, and
receive one or more swipe motion input signals indicating whether a swipe motion input was entered via the first display side or the second display side.

12. The system of claim 11, the first display mode comprising presenting information on a first side of the display panel, and the second display mode comprising presenting information on a second side of the display panel opposite the first side.

13. The system of claim 12, the second side comprising a touch screen.

14. The system of claim 13, the second side comprising a capacitive touch screen.

15. The system of claim 11, the display panel comprising a multilayer stack that includes an electrochromic layer to change opacity of the display panel.

16. The system of claim 15, the multilayer stack comprising a transparent light emitting diode (TLED) layer to display information.

17. The system of claim 16, the TLED layer comprising an active matrix TLED layer.

18. The system of claim 11, the display panel to switch between a transparent and an opaque state when in the open position.

19. The system of claim 11, the display panel to switch to a transparent state when the keyboard and the display panel are placed in a closed position.

20. An article of manufacture, comprising a non-transitory computer-readable storage medium containing instructions that, when executed by a processor, cause a system to:
determine whether the system comprising a display panel and keyboard panel coupled to the display panel in a clamshell manner is in an open or closed position;
set a first touch screen display mode when the system is in the closed position;
set a second touch screen display mode when the system is in the open position, the display panel to be at least partially transparent when in the second touch screen display mode such that an image is visible via a first display side and a second display side;
receive a swiping motion input;
present the image in a first orientation responsive to determining that the swiping motion input was entered via the first display side and the display panel is in the open position; and
present the image in a second orientation responsive to determining that the swiping motion input was entered via the second display side and the display panel is in the open position.

21. The article of manufacture of claim 20, the non-transitory computer-readable storage medium containing instructions that, when executed by the processor, cause the system to set a transparency of the display panel to a transparent state when the system is in the closed position.

22. The article of manufacture of claim 20, the non-transitory computer-readable storage medium containing instructions that, when executed by the processor, cause the system to switch orientation of an image presented on the display panel when the system changes from an open to closed position.

23. The article of manufacture of claim 20, the non-transitory computer-readable storage medium containing instructions that, when executed by the processor, cause the system to turn off indicator lights in the keyboard panel when the system is in the closed position.

24. The article of manufacture of claim 20, the non-transitory computer-readable storage medium containing instructions that, when executed by the processor, cause the system to activate a pointer in the display panel when the system is placed in the closed position.

25. A method, comprising:
determining whether a device comprising a display panel and a keyboard panel coupled to the display panel in a clamshell manner is in an open or closed position;
setting a first display mode in which input is to be received through the keyboard panel when the device is in an open position;
setting a second display mode in which input is to be received via a touch screen in the display panel when the device is in the closed position; and
setting a transparency of the display panel when the device is in the open position such that an image is visible via the first display side and the second display side;
receiving a swiping motion input;
presenting the image in a first orientation responsive to determining that the swiping motion input was entered via the first display side and the display panel is in the open position; and
presenting the image in a second orientation responsive to determining that the swiping motion input was entered via the second display side and the display panel is in the open position.

26. The method of claim 25, comprising switching orientation of an image presented on the display panel when the device changes from an open to closed position.

* * * * *